(12) United States Patent
Takahashi

(10) Patent No.: US 8,215,778 B2
(45) Date of Patent: Jul. 10, 2012

(54) PROJECTOR APPARATUS

(75) Inventor: Koichi Takahashi, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 233 days.

(21) Appl. No.: 12/803,316

(22) Filed: Jun. 24, 2010

(65) Prior Publication Data

US 2010/0328623 A1    Dec. 30, 2010

(30) Foreign Application Priority Data

Jun. 25, 2009 (JP) .................................. 2009-150813

(51) Int. Cl.
*G03B 21/28* (2006.01)
(52) U.S. Cl. .......................................... 353/81; 349/57
(58) Field of Classification Search .................... 353/81, 353/98, 99; 359/639, 640, 833, 631; 349/11, 349/57
See application file for complete search history.

(56) References Cited

U.S. PATENT DOCUMENTS

| | | | | |
|---|---|---|---|---|
| 5,418,584 A | * | 5/1995 | Larson | 353/122 |
| 5,812,323 A | * | 9/1998 | Takahashi | 359/630 |
| 5,818,641 A | * | 10/1998 | Takahashi | 359/629 |
| 6,301,052 B1 | * | 10/2001 | Carmeli | 359/630 |
| 7,352,521 B2 | * | 4/2008 | Matsunaga | 359/834 |
| 2002/0021498 A1 | * | 2/2002 | Ohtaka et al. | 359/629 |
| 2002/0181116 A1 | * | 12/2002 | Togino | 359/631 |
| 2003/0072092 A1 | * | 4/2003 | Togino | 359/833 |

FOREIGN PATENT DOCUMENTS

| | | |
|---|---|---|
| JP | 11-337824 | 12/1999 |
| JP | 2003-004910 | 1/2003 |
| JP | 2003-043361 | 2/2003 |
| JP | 2003-222819 | 8/2003 |
| JP | 2003-295107 | 10/2003 |

* cited by examiner

*Primary Examiner* — William C Dowling
(74) *Attorney, Agent, or Firm* — Kenyon & Kenyon LLP

(57) ABSTRACT

The invention provides a projector apparatus incorporating a prism optical system of positive refracting power working for size reductions, which apparatus comprises a display device 1, a prism optical system 3 that has positive refracting power and is adapted to enlarge and project an image on the display device, and a stop 4 located on a projection side thereof. The prism optical system 3 comprises an internal reflecting surface 12 concave on the image display plane 2 side, a combined optical surface 11 to transmit a light beam from the image display plane 2 and reflect a light beam reflected off at the internal reflecting surface 12, and an exit surface 13 through which a light beam entering the prism optical system 3 leaves. A light beam coming out of the image display plane 2 enters the prism optical system 3 from the combined optical surface 11, is then reflected off at the internal reflecting surface 12, and then leaves the exit surface 13, arriving at an image 5 to be projected through the stop 5. This light beam satisfies a specific condition in terms of a length fB, as calculated on an air basis, from the combined optical surface 11 of the prism optical system 3 to the image display plane 2.

13 Claims, 7 Drawing Sheets

PROJECTOR APPARATUS

BACKGROUND OF THE INVENTION

The present invention relates generally to a projector apparatus, and more specifically to a projector apparatus incorporating a prism optical system of positive refracting power.

So far, there have been projector apparatus known in the art, in which size reductions are achievable by use of a prism optical system having a concave internal reflecting surface for internal reflection of normal light beams and a combined optical surface located at a position opposite to that internal reflecting surface and having a combined reflection/refraction action.

In particular, Patent Publication 1 discloses a projector apparatus in which a stop member adapted to determine the thickness of a light beam emitted out of the center of an image display plane and projected while its periphery is shielded off is located on a projection side with respect to the exit surface of a prism optical system. This makes improvements in telecentric capability on the image display plane side, and prevents extraneous light from entering the prism optical system and shields off inessential light.

Patent Publication 1: JP(A) 2003-43361

In the prior apparatus, however, the distance between the prism optical system and the image display plane is short. In such a prism optical system as set forth in Patent Publication 1, accordingly, a light beam that should be refracted through the combined optical surface and a part of a rim light beam around it are reflected off, turning into inessential light. As this inessential light is again reflected off at the image display plane to enter the prism optical system for projection, it causes a worsening of the quality of a projection image, and gives rise to flares around the projection image.

In addition, when the image display plane of a reflection type display device is used as the image display plane, the angle of illumination light on the image display plane grows too large to make sure an optical path taken by illumination light for lighting the image display plane with high efficiency.

SUMMARY OF THE INVENTION

Having been made with the aforesaid problem in mind, the present invention has for its object to provide a projector apparatus incorporating a prism optical system having positive refracting power working in favor of size reductions, which apparatus makes it easy to eliminate or reduce the influences of inessential light occurring at the prism optical system.

In order to accomplish the aforesaid object, the present invention provides a projector apparatus comprising:

a display device having an image display plane for displaying an image, a prism optical system of positive refracting power adapted to enlarge and project said image displayed on said image display plane, and a stop located on a projection side with respect to said prism optical system and adapted to restrict the thickness of a light beam to be projected, wherein:

said prism optical system comprises an internal reflecting surface concave on said image display plane side, a combined optical surface adapted to transmit a normal light beam out of said image display plane and reflect a normal light beam reflected off at said internal reflecting surface, and an exit surface through which a normal light beam entering said prism optical system leaves, wherein:

a normal light leaving said image display plane takes such a path that it enters said prism optical system through said combined optical surface, is then reflected off at said internal reflecting surface and then at said combined optical surface, and then leaves said exit surface, arriving at an image to be projected through said stop, with satisfaction of the following condition (1):

$$0.3 < fB/fv < 1.5 \tag{1}$$

where fB is a length, as calculated on an air basis, from said combined optical surface of said prism optical system to said image display plane along a center ray where said center ray is defined as a normal ray that leaves a center of said image display plane and passes through a center of said stop, and fv is a value represented by $$fv = hH/(\tan \omega H)$$

where, given a horizontal direction is a direction vertical to a plane including a center ray before and after reflection at said internal reflecting surface, $\omega H$ is a maximum angle of projection with respect to a center ray on a projection side in said horizontal direction, and hH is a distance from the center of said image display plane to the farthest display position in said horizontal direction.

The requirement for, and the advantage of, this projector apparatus is now explained.

As the aforesaid prism optical system and stop are incorporated in the projector apparatus, it makes improvements in telecentric capability toward the image display plane side, ending up with decreases in the thickness of the optical system in the direction vertical to the image display plane and reductions in the quantity of extraneous light incident on the prism optical system.

On the other hand, as the distance between the combined optical surface of the prism optical system and the image display plane is too short, there is inessential light occurring from reflections at the combined optical system and the image display plane, and that inessential light is likely to be projected on the projection side. As the inessential light is subjected to internal reflection at the exit surface, there is stray light occurring inherently from the arrangement of the prism.

To eliminate or reduce the projected inessential light or keep the probability of inessential light being projected low and keep the whole optical system including the image display plane compact, therefore, the present invention is characterized by satisfying the aforesaid condition (1).

As the lower limit to condition (1) is set at not less than 0.3, it makes sure a given distance between the image display plane and the prism optical system, thereby eliminating or reducing the influences of a variety of inessential light and stray light.

For instance, as the combined optical plane is too close to the image display plane, it causes the normal light beam leaving the image display plane to be reflected off at the combined optical system, turning into inessential light. That inessential light will be again reflected off at the image display plane, entering the prism optical system through the combined optical system. If the image display plane is appropriately spaced away from the prism optical system in such a way as to satisfy condition (1), however, then it works in favor of guiding inessential light occurring from reflection at the combined optical surface to a position deviating from the image display plane or guiding inessential light occurring from reflection at the combined optical surface to a position where it does not enter the prism optical system. Especially with a part of the combined optical surface provided with a reflective coating, inessential light entering the prism is likely to turn into stray light, because it is totally reflected off at the exit surface, then reflected off at the reflective coating, and subsequently reflected off within the prism. However, spacing the image display plane away from the prism optical system helps reduce inessential light going back to within the prism, working in favor of improvements in the image quality of the projection image.

As the upper limit to condition (1) is set at not greater than 1.5, it permits the combined thickness of the image display plane and prism optical system to be kept small. At greater than that upper limit, the whole apparatus will grow large because of an increased proportion of the back focus fB relative to the virtual focal length fv of the prism optical system. In addition, the principal point position will have to be largely displaced on the projection side, resulting in much difficulty in the construction and design of the optical system involved.

To protect the aforesaid image display plane in this case, it is desired that there is a transparent optical member interposed between the aforesaid image display plane and the aforesaid prism optical system, and that the thickness of the aforesaid optical member along the aforesaid center ray satisfies the following condition (2):

$$0.17 \leq t1/fB \leq 0.7 \quad (2)$$

where t1 is the thickness of the aforesaid optical member in a direction-along the aforesaid center ray.

The requirement for, and the advantage of, this embodiment is now explained. The optical member for protecting the image display plane provides a physical protection of the image display plane, and prevents dusts, if deposited near the image display plane, from being included into the projection image.

It is then preferable that the optical member as the protective member satisfies the aforesaid condition (2) in terms of thickness. As the lower limit is set at not less than 0.17, it makes sure the thickness of the optical member, working in favor of protecting the image display plane, and keeping dusts from being included in the projection image. Alternatively, it helps reduce an increase in the back focus, working in favor of design of the optical system and, hence, leading to keeping the whole apparatus compact. As the upper limit is set at not greater than 0.7, it makes sure the distance between the optical member and the prism optical system, working in favor of preventing inessential light occurring from reflection at the optical member from entering the prism optical system, thereby eliminating or reducing stray light.

It is also desired that the aforesaid optical member is made of a material that satisfies the following condition (3):

$$1.4 \leq Ncb \leq 2.1 \quad (3)$$

where Ncb is the d-line refractive index of the aforesaid optical member.

The requirement for, and the advantage of, this embodiment is now explained. As the lower limit to condition (3) is set at not less than 1.4, it works for a choice of optical materials having good properties such as strength, and spectral characteristics. At greater than the upper limit of 2.1, there are only costly materials such as glass materials containing special metals, and ceramic materials. However, a material capable of satisfying condition (3) could function as a protective member yet be available at low costs.

It is further desired to satisfy the following condition (4) in terms of position relationships between the aforesaid stop, the aforesaid exit surface of the aforesaid prism optical system and the aforesaid image display plane.

$$SI/Iz < 0.6 \quad (4)$$

where SI is the distance between the aforesaid stop and the aforesaid exit surface along the aforesaid center ray, and Iz is the distance from the center of the aforesaid stop to a plane including the aforesaid image display plane.

The requirement for, and the advantage of, this embodiment is now explained. This condition (4) is provided to locate the stop at a proper position. As the upper limit is set at not greater than 0.6, it permits the distance from the stop to the prism system to be kept short and the distance from the stop to the image display plane to be kept long, working in favor of making sure a sufficient angle of projection while the prism optical system remains spaced away from the image display plane.

Further, it is desired that the aforesaid combined optical surface is provided with an antireflection coating at a portion outside of its effective area through which light rays transmit and at least a portion of its effective area at which light rays are reflected off.

The requirement for, and the advantage of, this embodiment is now explained. The application of the antireflection coating on the side of the combined optical surface near the stop works in favor of permitting the projection image to have a wide angle. When the normal light beam is allowed to leave the stop and travel upwardly toward the projection image (in the case where the image display plane is located underneath the image display plane), the angle of incidence of the normal light beam often becomes less than the critical angle upon internal reflection. This is the prerequisite for design of wide-projection-angle specifications in particular. If, in this case, a metal or other reflective coating is applied to a portion of the combined optical surface on which the normal light beam is incident at smaller than the critical angle, then the normal light beam leaving the image display plane can be guided into the prism optical system so that after internal reflection there, it can be reflected off at the combined optical surface with good efficiency to form the projection image via the stop.

Conversely in the absence of such a partial reflective coating, a part of a light beam incident at smaller than the critical angle transmits through the combined optical surface: it does not arrive at the projection image, giving rise to variations in the brightness of the projection image or there is none of the image displayed on the upper portion.

Further, it is desired that the range of the aforesaid reflective coating applied satisfies the following condition (5):

$$0.05 < BH/ZH < 0.5 \quad (5)$$

where ZH is the length of a line segment that connects both ends of the effective reflecting area of the aforesaid combined optical surface in a plane including the center ray before and after reflection at the aforesaid internal reflecting surface, and BH is the length of a line segment that connects both ends of the reflective coating portion in the effective reflecting area of the aforesaid combined optical surface in a plane including the center ray before and after reflection at the aforesaid internal reflecting surface.

The requirement for, and the advantage of, this embodiment is now explained. This condition (5) defines a preferable coating area for the reflective coating applied to the combined optical surface. As the reflective coating is applied at the lower limit set at not less than 0.05, it works in favor of making sure the projection angle of view, and reducing variations in the brightness of the projection image. It is preferable that the upper limit is set at not greater than 0.5, because the reflective coating area is set in a proper range, making sure an effective optical path for transmission. This also helps reduce the size of the combined optical surface with respect to the image display plane, working in favor of size reductions of the prism and, hence, the whole projector apparatus.

Further, it is desired that the aforesaid display device is of the reflection type, and comprises a lighting system for lighting the image display plane of the aforesaid display device, wherein the aforesaid lighting system comprises a lighting portion and a reflecting surface adapted to reflect a light beam emitted out of the aforesaid lighting portion for illumination of the aforesaid image display plane.

The requirement for, and the advantage of, this embodiment is now explained. As a reflection type liquid crystal display device or a DMD (Digital Micromirror Device: the registered trademark of TI Co., Ltd.) light bulb is used, it allows projection to be implemented with energy losses less than those with a transmission type liquid crystal device, working in favor of energy savings while the brightness of the projection image is maintained.

The present invention works in favor of making sure an optical path for illumination, because there is a given distance between the prism optical system and the image display plane. If, in this case, a reflecting surface is incorporated in the lighting system, then the angle of incidence of light rays for lighting the image display plane can then be made small, working in favor of making sure the quantity of light, etc.

Further, it is preferable that the aforesaid lighting system includes two wedge prisms interposed between the aforesaid display device and the aforesaid prism optical system in such a way that a light beam emitted out of the aforesaid lighting portion is reflected multiple times in the wedge prisms and then arrives at the aforesaid image display plane, and a normal light beam leaving the aforesaid image display plane is guided into the aforesaid prism optical system through the aforesaid two wedge prisms.

The requirement for, and the advantage of, this embodiment is now explained. According to the invention it is possible to make sure a given distance between the image display plane and the prism optical system. As the aforesaid wedge prisms are interposed in this spacing, it permits the angle of incidence of illuminating light for the image display plane to be kept small while achieving space savings, working in favor of making sure the brightness of the projection image.

In another embodiment of the invention, the aforesaid image display device is of the reflection type, and comprises a lighting system for lighting the image display plane of the aforesaid display device, wherein the lighting system includes an lighting portion and a reflecting surface adapted to reflect, a light beam emitted out of the aforesaid lighting portion for illumination of the aforesaid image display plane, wherein the aforesaid reflecting surface in the aforesaid lighting system is defined by the aforesaid reflective coating applied onto the aforesaid combined optical surface.

The requirement for, and the advantage of, this embodiment is now explained. When the reflection type liquid crystal display device or DMD (Digital Micromirror Device: the registered trademark of TI Co., Ltd.) is used as the display device having an image display plane, it is preferable to have a higher freedom degree in terms of the angle of incidence of illuminating light incident on the image display plane. For instance, if the illuminating light has once been reflected off at the reflective coating applied to the combined optical surface, it is then possible to light the display plane at a small angle of incidence. When the micromirror array of DMD tilting as the pixels are put on and off is in an off state, it is desired that light rays reflected off at the micromirrors are not guided into the prism optical system. According to the invention wherein there is a given distance provided between the image display plane and the combined optical system, it is possible to make sure an optical path for illumination and the freedom degree of the angle of incidence of rays for lighting the image display plane, thereby improving the projection image quality.

To provide a protection of the aforesaid image display plane, there may be a transparent optical member interposed between the aforesaid image display plane and the aforesaid prism optical system, and a second optical member joined to the prism optical system side of the aforesaid optical member and having a refracting surface tilting with respect to the aforesaid center ray.

The requirement for, and the advantage of, this embodiment is now explained. Reflection at the prism optical system side surface of the optical member for protection of the image display plane (hereinafter called the first optical member) is often responsible for stray light. For this reason, the second optical member is cemented to the prism optical system side of the first optical member so that the quantity of light reflected off at the first optical member can be reduced.

On the other hand, although inessential light is likely to occur at the refracting surface on the prism optical system side of the second optical member, yet optical design with a controlled optical path taken by inessential light occurring at that surface can be carried out because that refracting surface tilts with respect to the center ray, working in favor of improvements in the quality of the projection image.

In this case, it is desirous for the aforesaid tilting refracting surface to satisfy the following condition (6):

$$5° < \theta s < 15° \quad (6)$$

where θs is the angle made, in a planar section including the center ray just after leaving the aforesaid tilting refracting surface and the center of the aforesaid stop, between the center ray just after leaving the refracting surface and a perpendicular toward the aforesaid prism optical system side at a position of the aforesaid refracting surface through which the aforesaid center ray passes, provided that a perpendicular tilting in a direction away from the stop is assumed to have plus sign.

The requirement for, and the advantage of, this embodiment is now explained. As the lower limit to condition (5) is set at not less than 5°, it permits the influences of inessential light resulting from the tilting refracting surface to be easily eliminated or reduced. As the upper limit is set at not greater than 15°, it allows the space for tilting the refracting surface to be kept so small that any increase in the distance from the prism to the image plane can be held back, facile in design of the optical system.

Further, it is desired that the absolute value of a d-line refractive index difference between the aforesaid optical member and the aforesaid second optical member is set at 0.5 or less.

The requirement for, and the advantage of, this embodiment is now explained. As the refractive index difference between the first optical member and the second optical member is kept small, it enables reflection at the boundary surface between the first and the second optical member to be more easily eliminated or reduced.

Further, it is desired to satisfy the following condition (7):

$$1.0 \text{ mm} < hH < 2.5 \text{ mm} \quad (7)$$

The requirement for, and the advantage of, this embodiment is now explained. As the lower limit to condition (7) is set at not less than 1.0 mm, it makes adjustment of the positions of the image display device, stop and prism optical system easy. In addition, the provision of the optical members between the image display plane and the prism optical system works in favor of making sure strength due to the thicknesses of those optical members. As the upper limit is set at not greater than 2.5 mm, it permits the size of the prism optical system to be diminished. Thus, even when there is a sufficient distance provided between the image display plane and the prism optical system in view of the size of the prism optical system, the size of the whole optical system can remain small.

More preferably, two or more of the aforesaid embodiments should be combined in use, and the respective conditions should be changed as follows, because the aforesaid advantages are achievable in a more reliable manner.

More preferably, the lower and upper limits to condition (1) should be set at 0.45, specifically 0.6, and 1.3, specifically 1.15, respectively.

More preferably, the lower and upper limits to condition (2) should be set at 0.2, specifically 0.3, more specifically 0.4, and 0.6, specifically 0.5, respectively.

More preferably, the lower limit to condition (3) should be set at 1.5.

More preferably, the upper limit to condition (4) should be set at 0.2, specifically 0.1.

More preferably, the lower and upper limits to condition (5) should be set at 0.1, specifically 0.15, and 0.46, specifically 0.43, respectively.

More preferably, the upper limit to condition (6) should be set at 8°, specifically 12°.

More preferably, the lower and upper limits to condition (7) should be set at 1.5 mm, specifically 1.7 mm, and 2.2 mm, specifically 2.0 mm, respectively.

According to the present invention, there can be a projector apparatus provided which incorporates a prism optical system having positive refracting power in favor of size reductions, and in which the influences of inessential light occurring at the prism optical system can easily be held back.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
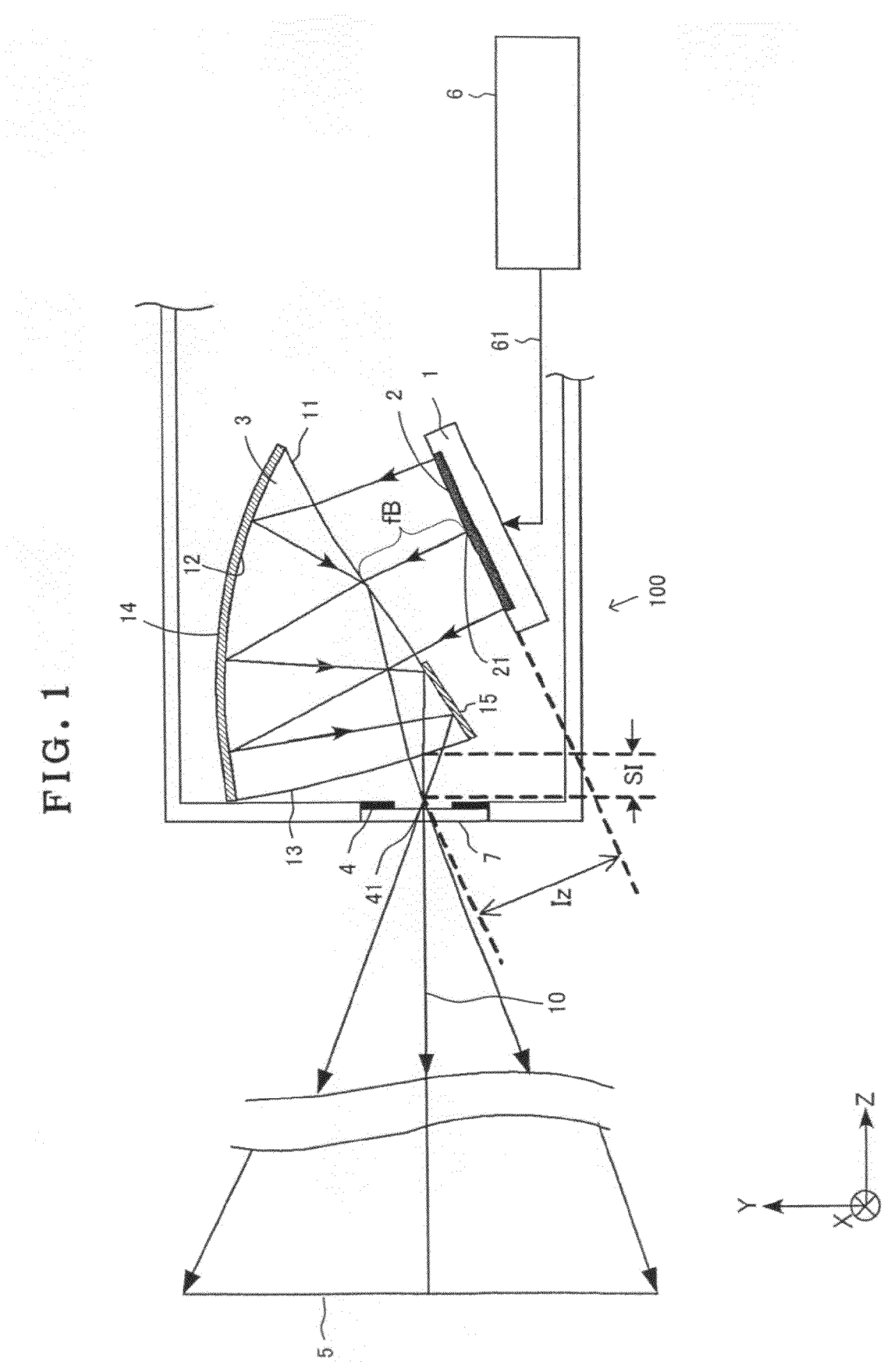
FIG. 1 is illustrative in schematic section of the fundamental arrangement of the projector apparatus according to the invention.
Figure 2:
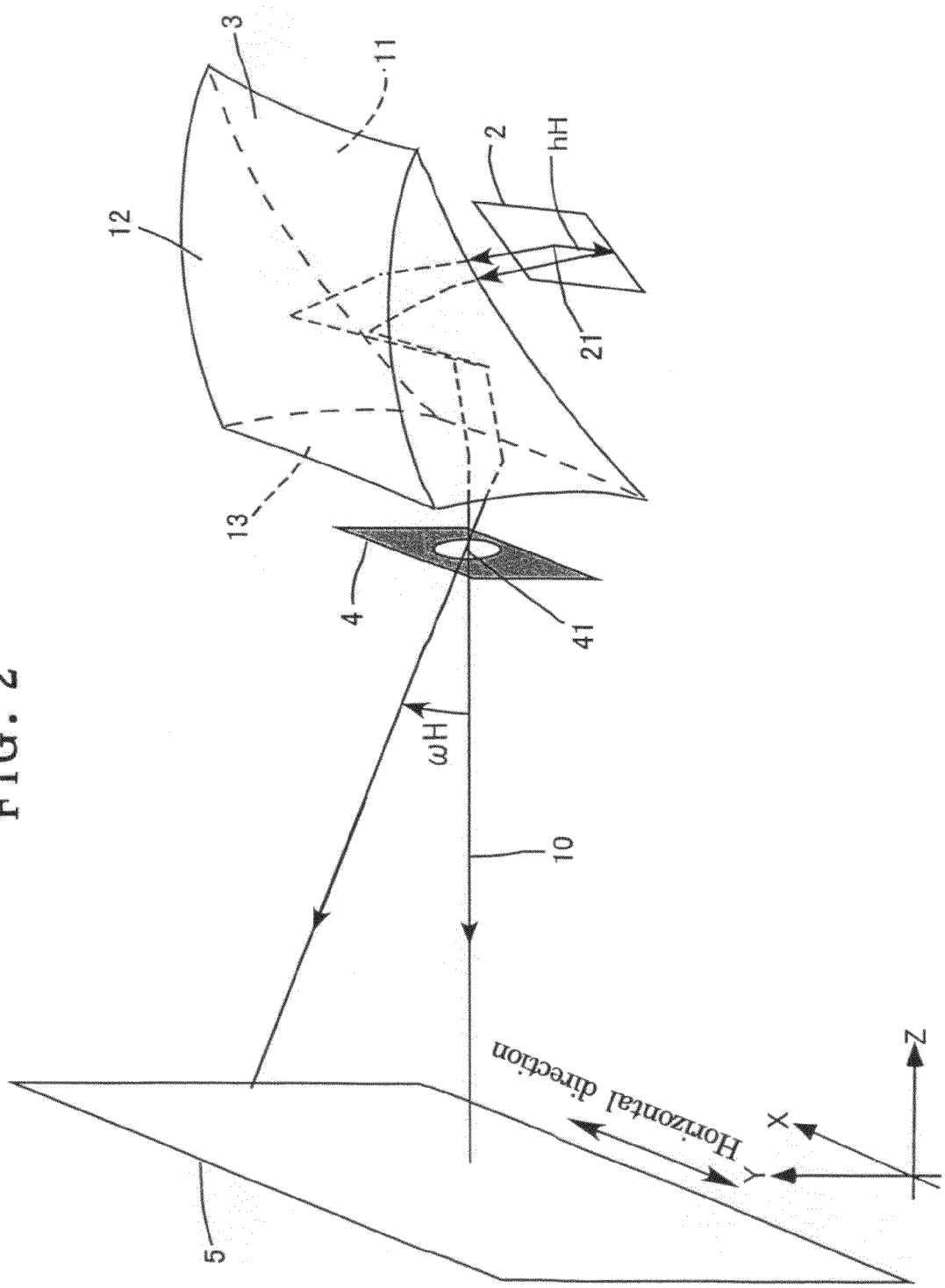
FIG. 2 is illustrative in schematic perspective of an optical system portion of the inventive projector apparatus shown in FIG. 1.

The projector apparatus of the invention is now explained with reference to the accompanying drawings. FIG. 1 is illustrative in schematic section of the basic arrangement of the inventive projector apparatus, and FIG. 2 is illustrative in schematic perspective of an optical system portion therein.

As shown in FIG. 1, the inventive projector apparatus 100 comprises a display device 1 having an image display plane 2 for displaying an image, and includes a prism optical system 3 of positive refracting power adapted to enlarge and project an image displayed on the image display plane 2, and a stop 4 located on a projection side with respect to the prism optical system 3 and adapted to restrict the thickness of the light beam to be projected.

The prism optical system 3 comprises an internal reflecting surface 12 concave on the image display plane 2 side, a combined optical surface 11 that transmits a normal light beam from the image display plane 2 and reflects a normal light beam reflected off at the internal reflecting surface 12, and an exit surface 13 through which a normal light beam entering the prism optical system 3 leaves. The normal light beam leaving the image display plane 2 takes such a path that it enters the prism optical system 3 through the combined optical surface 11, is then reflected off at the internal reflecting surface 12 and then at the combined optical surface 11, and then leaves the exit surface 13, arriving at a projection image 5 through the stop 4.

As shown, it is usual that a reflective coating 14 is provided over the internal reflecting surface 12, and that outside of an effective area through which light rays from the combined optical surface 11 transmit, and on at least a portion of an effective area where light rays are reflected off, there is a reflective coating 15 applied.

In FIGS. 1 and 2, the center of the image display surface 2 is indicated at 21, and the center of the stop 4 is indicated at 41; the normal ray leaving the center 21 of the image display plane 2, passing through the prism optical system 3 and traveling through the center 41, of the stop 4 is here defined as a center ray 10.

fB in condition (1) for the inventive projector apparatus and hH and ωH that define fv in condition (1), and SI and Iz in condition (4) are given in FIGS. 1 and 2.

The display device 1 is connected with an image signal source 6, and an image signal 61 is sent out to the display device 1 via a connection line so that an image displayed on the image display plane 2 is projected via the prism optical system 3 and the stop 4 in order onto a remote screen or the like as a projection image 5 to be viewed from its transmission side or its reflection side. In the arrangement of FIG. 1, a cover member 7 comprising a plane-parallel plate is located in front of the stop 4 (on the projection side).

Although not restrictive, the inventive prism optical system 3 is usually positioned with the center ray 10 lying on the same plane (the drawing sheet of FIG. 1); it is plane-symmetrical with that plane.

Numerical examples 1 to 5 in which a cover glass 22 is used as an optical member that protects the image display plane 2 of the display device 1 are specifically presented in FIGS. 3 to 7. Numerical data on each numerical example will be given later. The respective numerical data are shown in terms of back ray tracing, with the projection image 5 and image display plane 2 assumed as an object plane and an image plane, respectively.

Throughout the examples, the projection image distance is designed as being focused at infinity; however, near-distance image displays may be possible within the depth of focus. Focusing may also be implemented by movement of the image display plane 2 in a direction along the center ray 10.

The coordinate system, decentered surface and free-form surface used in the following numerical examples are now explained.

Figure 3:
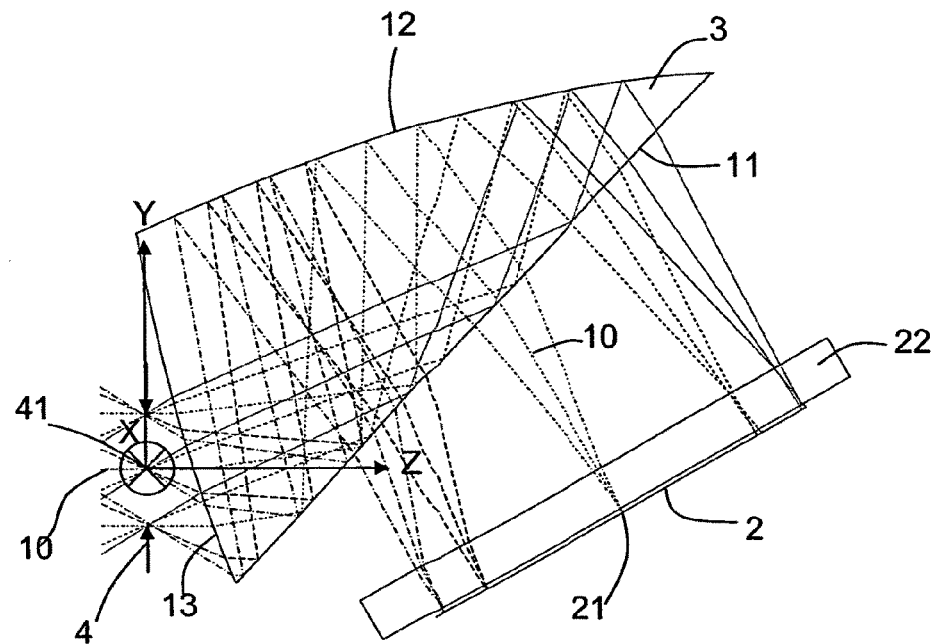
FIG. 3 is illustrative in Y-Z section, including the center ray, of an optical system in the inventive projector apparatus of Example 1.
Figure 4:
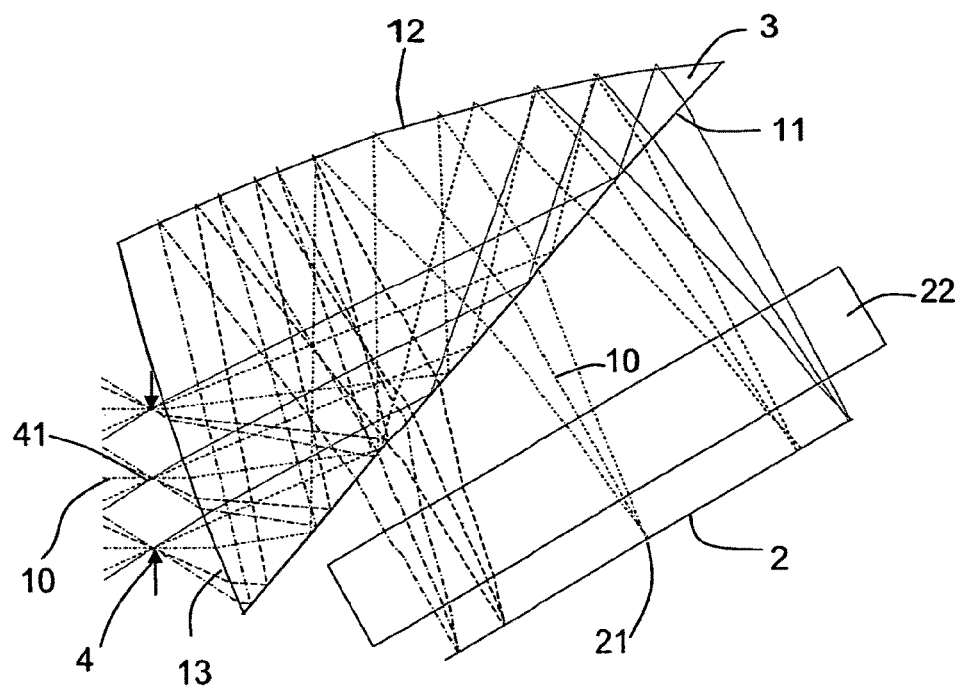
FIG. 4 is illustrative in Y-Z section, including the center ray, of an optical system in the inventive projector apparatus of Example 2.
Figure 5:
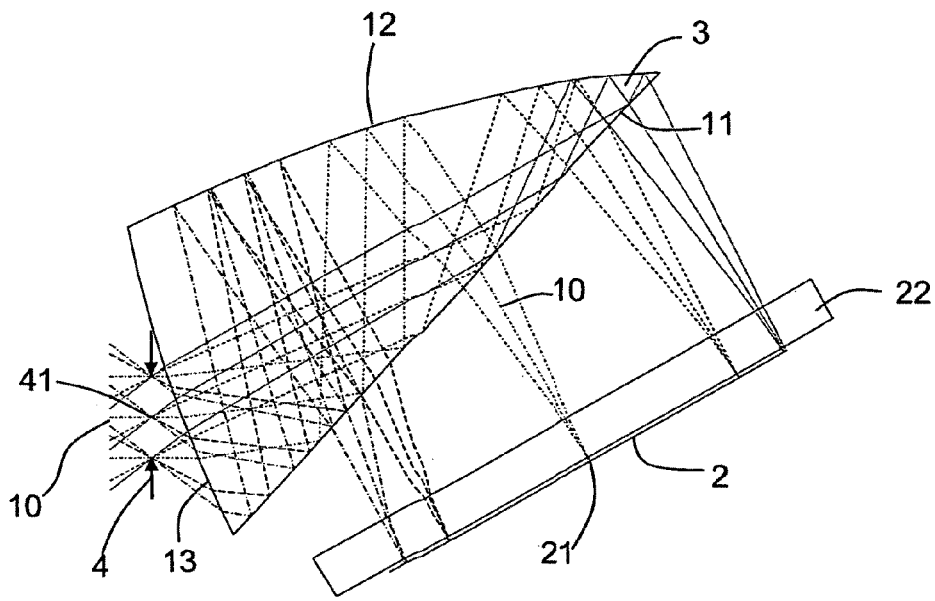
FIG. 5 is illustrative in Y-Z section, including the center ray, of an optical system in the inventive projector apparatus of Example 3.
Figure 6:
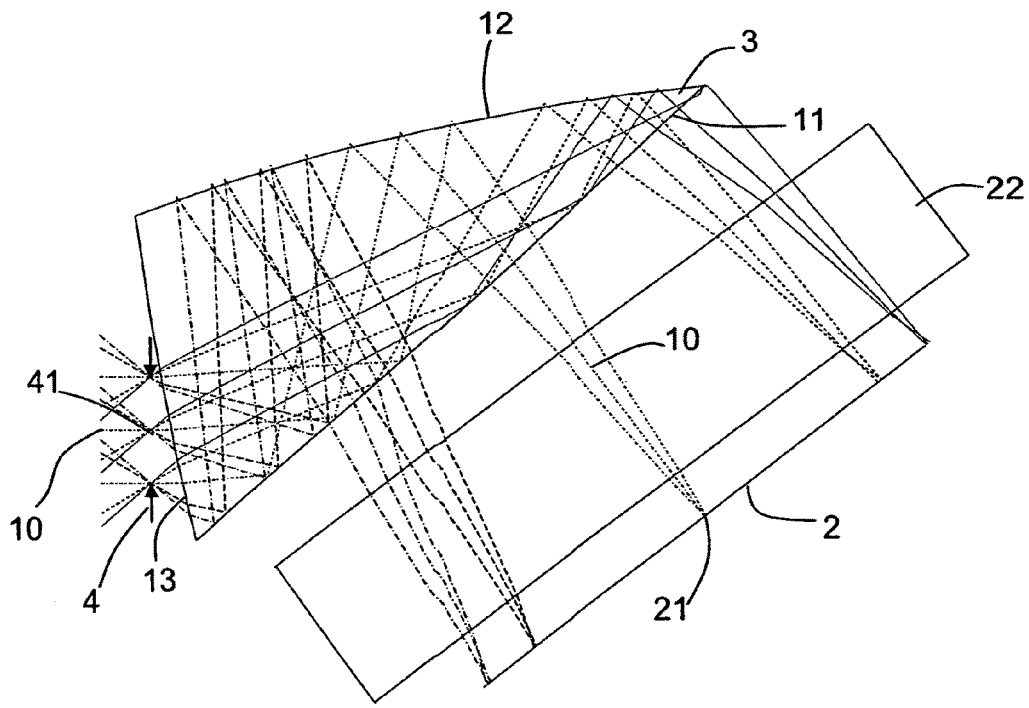
FIG. 6 is illustrative in Y-Z section, including the center ray, of an optical system in the inventive projector apparatus of Example 4.
Figure 7:
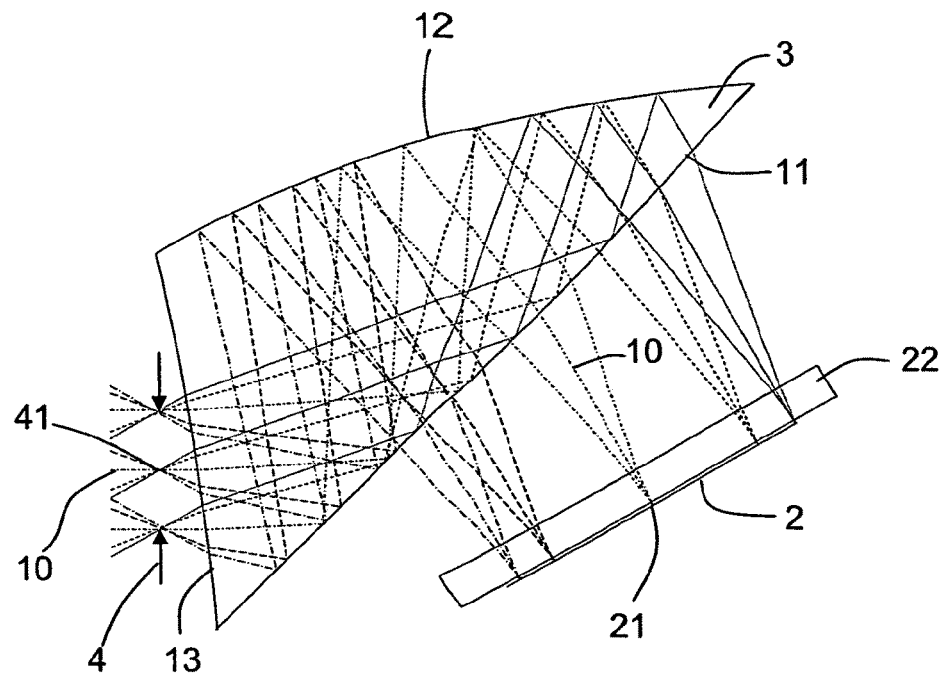
FIG. 7 is illustrative in Y-Z section, including the center ray, of an optical system in the inventive projector apparatus of Example 5.

In each example, the center ray 10 is defined by a ray that comes out of the center of an object 5 (projection image), passes through the center 41 of an aperture in a stop 4, and arrives at the center of an image plane (image display plane) 2, as shown in FIG. 3.

And let the center 41 of the stop 4 be the origin, let the direction of travel of the center ray 10 (upon back ray tracing) be the positive Z-axis direction, a plane including the Z-axis and the center of the image plane be the Y-Z plane, the positive X-axis direction be defined by a direction that passes through the origin, is orthogonal to the Y-Z plane and orients from the front to the back of the drawing sheet, and the Y-axis be defined by an axis that forms a right-handed orthogonal coordinate system with the X- and Z-axes. The X-, Y- and Z-axes are also shown in FIGS. 1 and 3.

In Numerical Examples 1 to 5, each surface is decentered in the Y-Z plane, and only one plane of symmetry of each rotationally asymmetric free-form surface is given by the Y-Z plane.

Given to each decentered surface are the amount of decentration of the apex of that surface from the center of the origin of the optical system (X, Y and Z in the X-, Y- and Z-axis directions) and the angles ($\alpha$, $\beta$, $\gamma$(°)) of tilt of the center axis of that surface (the Z-axis in the following formula (a) for a free-form surface) with respect to the X-axis, the Y-axis, and the Z-axis, respectively. It is here noted that the positive $\alpha$ and $\beta$ means clockwise rotation with respect to the positive directions of the respective axes, and the positive $\gamma$ means clockwise rotation with respect to the positive direction of the Z-axis. Referring to the $\alpha$, $\beta$, $\gamma$ rotation of the center axis of a certain surface, the center axis and the associated XYZ orthogonal coordinate is first $\alpha$ rotated counterclockwise about the X-axis. Then, the center axis of the rotated surface is $\beta$ rotated counterclockwise about the Y-axis of a new coordinate system, and the once rotated coordinate system is $\beta$ rotated counterclockwise about the Y-axis too. Then, the center axis of the twice rotated surface is $\gamma$ rotated clockwise about the Z-axis of a new coordinate system.

When a specific surface of the optical function surfaces forming the optical system of each numerical example and the subsequent surface form together a coaxial optical system, there is a surface-to-surface spacing given. Besides, the refractive indices and Abbe constants of the media are given as usual.

The free-form surface used herein is defined by the following formula (a). Note here that the axis of the free-form surface is given by the Z-axis of that defining formula.

$$Z = (r^2/R) / [1 + \sqrt{\{1 - (1+k)(r/R)^2\}}] + \sum_{j=1}^{66} C_j X^m Y^n \quad (a)$$

In formula (a) here, the first term is a spherical term and the second term is a free-form surface term.

In the spherical term,
R is the radius of curvature of the vertex,
k is a conic constant, and
$r = \sqrt{(X^2 + Y^2)}$.

The free-form surface term is $$\sum_{j=1}^{66} C_j X^m Y^n = C_1 + C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \ldots$$

Here $C_j$ (j is an integer of 1 or greater) is a coefficient.

In general, the aforesaid free-form surface has no plane of symmetry at both the X-Z plane and the Y-Z plane. However, by reducing all the odd-numbered terms for X down to zero, that free-form surface can have only one plane of symmetry parallel with the Y-Z plane. For instance, this may be achieved by reducing down to zero the coefficients for the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . .

By reducing all the odd-numbered terms for Y down to zero, the free-form surface can have only one plane of symmetry parallel with the X-Z plane. For instance, this may be achieved by reducing down to zero the coefficients for the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . .

If any one of the direction of the aforesaid plane of symmetry is used as the plane of symmetry and decentration is implemented in a direction corresponding to that, for instance, the direction of decentraton of the optical system with respect to the plane of symmetry parallel with the Y-Z plane is set in the Y-axis direction and the direction of dencentration of the optical system with respect to the plane of symmetry parallel with the X-Z plane is set in the X-axis direction, it is then possible to improve productivity while, at the same time, making effective correction of rotationally asymmetric aberrations occurring from decentration.

The aforesaid defining formula (a) is given for the sake of illustration alone: the feature of the invention is that by use of the plane symmetric free-form surface having only one plane of symmetry, it is possible to correct rotationally asymmetric aberrations occurring from decentration while, at the same time, improving productivity. It goes without saying that the same advantages are achievable even with any other defining formulae.

It is here noted that the term with respect to the free-form surface about which no data are given is zero. For the index of refraction, d-line (of 587.56 nm wavelength) refractive indices are given. Length is given in mm.

It is also noted that the focal length is given by values in the X direction (vertical to the drawing sheet) and the direction (of the drawing sheet) depending on local changes in the image height and angle of view.

FIGS. 3 to 7 are Y-Z sectional views including the center ray 10 of the optical systems in the projector apparatus of Examples 1 to 5, respectively. In each optical system, display light from an image display plane (image plane) 2 enters a prism optical system 3 through a cover glass 22 and a combined optical surface 11 of the prism optical system 3, and is reflected off at an internal reflecting surface 12 and again at the combined optical surface 11. The reflected light leaves the prism optical system 3 from an exit surface 13, and passes through a stop 4 to project and form a projection image 5 (FIGS. 1 and 2; an object plane) at infinity, although not shown.

Throughout the examples, the combined optical surface 11, internal reflective surface 12 and exit surface 13 of the prism optical system 3 are each made of a free-form surface of which the Y-Z planes provides only a plane of symmetry, and configured into a rotationally asymmetric surface shape having power and capable of making correction of aberrations occurring from decentration. Configuring especially the reflecting surface into such a surface shape is effective for correction of aberrations occurring from decentration.

Tabulated below are numerical data on Numerical Examples 1 to 5. In the following tables, FFS and RS are the acronyms of the free-form surface and the reflecting surface, respectively. In what follows, fx and fy are indicative of focal lengths in the X and Y directions, respectively; fno(x) and fno(y) are indicative of F-numbers in the X and Y directions, respectively; $2\omega$ is indicative of a horizontal angle of view; DFS(H×V) is indicative of image display plane size; and $\phi$ is indicative of a stop aperture diameter.

In the following data, E-000n where n is an integer means $\times 10^{-n}$.

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS[1] | | (1) | 1.8061 | 40.9 |
| 3 | FFS[2] (RS) | | (2) | 1.8061 | 40.9 |
| 4 | FFS[3] (RS) | | (3) | 1.8061 | 40.9 |
| 5 | FFS[2] | | (2) | | |
| 6 | ∞ | 0.30 | (4) | 1.5163 | 64.1 |
| 7 | ∞ | 0.03 | | | |
| Image plane | ∞ | | | | |

| FFS[1] | | | | | |
|---|---|---|---|---|---|
| $C_4$ | 6.2814e−002 | $C_6$ | 4.6030e−002 | | |
| FFS[2] | | | | | |
| $C_4$ | 1.4854e−002 | $C_6$ | −1.6938e−003 | $C_8$ | 3.9423e−003 |
| $C_{10}$ | 1.7926e−003 | $C_{11}$ | −4.7183e−004 | $C_{13}$ | −2.1844e−003 |
| $C_{15}$ | 1.9874e−005 | | | | |
| FFS[3] | | | | | |
| $C_4$ | 5.8854e−002 | $C_6$ | 4.0878e−002 | $C_8$ | 6.1341e−003 |
| $C_{10}$ | 4.2201e−003 | $C_{11}$ | −4.4895e−004 | $C_{13}$ | −2.7971e−003 |
| $C_{15}$ | 1.5664e−004 | | | | |

| Displacement and tilt(1) | | | | | |
|---|---|---|---|---|---|
| X | 0.00 | Y | 0.00 | Z | 0.30 |
| α | 17.33 | β | 0.00 | γ | 0.00 |

| Displacement and tilt(2) | | | | | |
|---|---|---|---|---|---|
| X | 0.00 | Y | 0.00 | Z | 1.26 |
| α | −41.86 | β | 0.00 | γ | 0.00 |

| Displacement and tilt(3) | | | | | |
|---|---|---|---|---|---|
| X | 0.00 | Y | 2.10 | Z | 1.27 |
| α | −70.85 | β | 0.00 | γ | 0.00 |

| Displacement and tilt(4) | | | | | |
|---|---|---|---|---|---|
| X | 0.00 | Y | 0.00 | Z | 2.91 |
| α | −60.00 | β | 0.00 | γ | 0.00 | fx = 2.05
fy = 2.10
fno(x) = 2.89
fno(y) = 2.78
$2\omega$ = 80°
DFS (H × V) = 1.715723 × 1.363205
ø = 0.75

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS[1] | | (1) | 1.6326 | 23.3 |
| 3 | FFS[2] (RS) | | (2) | 1.6326 | 23.3 |
| 4 | FFS[3] (RS) | | (3) | 1.6326 | 23.3 |
| 5 | FFS[2] | | (2) | | |
| 6 | ∞ | 0.50 | (4) | 1.5163 | 64.1 |
| 7 | ∞ | 0.29 | | | |
| Image plane | ∞ | | | | |

| FFS[1] | | | | | |
|---|---|---|---|---|---|
| $C_4$ | 9.9816e−002 | $C_6$ | 4.9087e−002 | $C_8$ | −8.0402e−003 |
| $C_{10}$ | 2.4616e−003 | $C_{11}$ | −1.6332e−003 | | |
| FFS[2] | | | | | |
| $C_4$ | 1.0578e−002 | $C_6$ | −4.6282e−003 | $C_8$ | −5.0398e−004 |
| $C_{10}$ | 2.6875e−003 | $C_{11}$ | 1.6150e−003 | $C_{13}$ | −1.7441e−003 |
| $C_{15}$ | −8.9921e−005 | $C_{17}$ | 3.8019e−004 | $C_{19}$ | 4.5208e−004 |
| $C_{21}$ | −5.8659e−005 | $C_{22}$ | 8.1285e−004 | | |
| FFS[3] | | | | | |
| $C_4$ | 6.0336e−002 | $C_6$ | 5.0456e−002 | $C_8$ | 4.8339e−003 |
| $C_{10}$ | 4.8339e−003 | $C_{11}$ | −2.0620e−003 | $C_{13}$ | −4.1111e−003 |
| $C_{15}$ | −3.7525e−004 | $C_{17}$ | 1.2871e−003 | $C_{19}$ | 1.7969e−003 |
| $C_{21}$ | −1.0708e−005 | $C_{22}$ | 4.0945e−004 | | |

| Displacement and tilt(1) | | | | | |
|---|---|---|---|---|---|
| X | 0.00 | Y | 0.00 | Z | 0.20 |
| α | 19.82 | β | 0.00 | γ | 0.00 |

| Displacement and tilt(2) | | | | | |
|---|---|---|---|---|---|
| X | 0.00 | Y | 0.00 | Z | 1.13 |
| α | −40.95 | β | 0.00 | γ | 0.00 |

| Displacement and tilt(3) | | | | | |
|---|---|---|---|---|---|
| X | 0.00 | Y | 1.86 | Z | 1.11 |
| α | −70.26 | β | 0.00 | γ | 0.00 |

-continued

| | Displacement and tilt(4) | | | | | |
|---|---|---|---|---|---|---|
| X | 0.00 | Y | 0.32 | Z | 2.33 | |
| α | −60.00 | β | 0.00 | γ | 0.00 | | fx = 1.98
fy = 2.11
fno(x) = 2.64
fno(y) = 2.82
2ω = 80°
DFS (H × V) = 1.772204 × 1.245096
ø = 0.75

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS[1] | | (1) | 1.6069 | 27.0 |
| 3 | FFS[2] (RS) | | (2) | 1.6069 | 27.0 |
| 4 | FFS[3] (RS) | | (3) | 1.6069 | 27.0 |
| 5 | FFS[2] | | (2) | | |
| 6 | ∞ | 0.30 | (4) | 1.5163 | 64.1 |
| 7 | ∞ | 0.03 | | | |
| Image plane | ∞ | | | | |

FFS[1]

| $C_4$ | 8.3690e−002 | $C_6$ | 5.4522e−002 | $C_8$ | −1.2074e−002 |
|---|---|---|---|---|---|
| $C_{10}$ | 5.0143e−003 | $C_{11}$ | 1.7662e−005 | | |

FFS[2]

| $C_4$ | 2.0908e−002 | $C_6$ | −3.5378e−003 | $C_8$ | 2.0944e−003 |
|---|---|---|---|---|---|
| $C_{10}$ | 2.4003e−003 | $C_{11}$ | −4.6218e−004 | $C_{13}$ | −2.1065e−003 |
| $C_{15}$ | −6.4080e−006 | $C_{17}$ | −2.7515e−004 | $C_{19}$ | 1.8488e−004 |
| $C_{21}$ | −1.2152e−005 | $C_{22}$ | 1.9811e−004 | | |

FFS[3]

| $C_4$ | 7.4135e−002 | $C_6$ | 4.9845e−002 | $C_8$ | 6.0291e−003 |
|---|---|---|---|---|---|
| $C_{10}$ | 3.9710e−003 | $C_{11}$ | −7.2828e−004 | $C_{13}$ | −4.3766e−003 |
| $C_{15}$ | −5.5447e−004 | $C_{17}$ | 7.6342e−004 | $C_{19}$ | 1.0249e−003 |
| $C_{21}$ | 4.3915e−004 | $C_{22}$ | 1.8235e−005 | | |

Displacement and tilt(1)

| X | 0.00 | Y | 0.00 | Z | 0.21 |
|---|---|---|---|---|---|
| α | 20.94 | β | 0.00 | γ | 0.00 |

Displacement and tilt(2)

| X | 0.00 | Y | 0.00 | Z | 1.26 |
|---|---|---|---|---|---|
| α | −41.51 | β | 0.00 | γ | 0.00 |

Displacement and tilt(3)

| X | 0.00 | Y | 1.84 | Z | 1.19 |
|---|---|---|---|---|---|
| α | −70.40 | β | 0.00 | γ | 0.00 |

Displacement and tilt(4)

| X | 0.00 | Y | 0.00 | Z | 2.71 |
|---|---|---|---|---|---|
| α | −60.00 | β | 0.00 | γ | 0.00 | fx = 1.79
fy = 1.85
fno(x) = 2.2
fno(y) = 2.1
2ω = 90°
DFS (H × V) = 1.790363 × 1.43295
ø = 0.85

EXAMPLE 4

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS[1] | | (1) | 1.6326 | 23.3 |
| 3 | FFS[2] (RS) | | (2) | 1.6326 | 23.3 |
| 4 | FFS[3] (RS) | | (3) | 1.6326 | 23.3 |
| 5 | FFS[2] | | (2) | | |
| 6 | ∞ | 0.80 | (4) | 1.5163 | 64.1 |
| 7 | ∞ | 0.22 | | | |
| Image plane | ∞ | | | | |

FFS[1]

| $C_4$ | 1.5052e−001 | $C_6$ | 3.8428e−002 | $C_8$ | −1.6215e−002 |
|---|---|---|---|---|---|
| $C_{10}$ | −2.6626e−003 | $C_{11}$ | 6.6401e−003 | | |

FFS[2]

| $C_4$ | 1.5498e−002 | $C_6$ | −1.0122e−002 | $C_8$ | −2.2971e−002 |
|---|---|---|---|---|---|
| $C_{10}$ | −2.0275e−003 | $C_{11}$ | 1.9906e−002 | $C_{13}$ | −2.3448e−003 |
| $C_{15}$ | 1.4552e−003 | $C_{17}$ | 3.6254e−002 | $C_{19}$ | −3.3240e−003 |
| $C_{21}$ | −2.8435e−004 | $C_{22}$ | −2.3333e−002 | | |

FFS[3]

| $C_4$ | 5.7474e−002 | $C_6$ | 5.5708e−002 | $C_8$ | −1.0332e−002 |
|---|---|---|---|---|---|
| $C_{10}$ | −8.0299e−004 | $C_{11}$ | 4.8921e−003 | $C_{13}$ | −1.7613e−002 |
| $C_{15}$ | −2.6271e−003 | $C_{17}$ | 2.3444e−002 | $C_{19}$ | 4.2046e−003 |
| $C_{21}$ | 7.1932e−004 | $C_{22}$ | −9.0711e−003 | | |

Displacement and tilt(1)

| X | 0.00 | Y | 0.08 | Z | 0.12 |
|---|---|---|---|---|---|
| α | 11.15 | β | 0.00 | γ | 0.00 |

Displacement and tilt(2)

| X | 0.00 | Y | 0.02 | Z | 0.88 |
|---|---|---|---|---|---|
| α | −49.23 | β | 0.00 | γ | 0.00 |

Displacement and tilt(3)

| X | 0.00 | Y | 1.31 | Z | 0.77 |
|---|---|---|---|---|---|
| α | −73.82 | β | 0.00 | γ | 0.00 |

Displacement and tilt(4)

| X | 0.00 | Y | 0.00 | Z | 1.50 |
|---|---|---|---|---|---|
| α | −52.93 | β | 0.00 | γ | 0.00 | fx = 1.62
fy = 1.74
fno(x) = 3.2
fno(y) = 3.5
2ω = 95°
DFS (H × V) = 1.899951 × 1.322169
ø = 0.5

EXAMPLE 5

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS[1] | | (1) | 1.8061 | 40.9 |
| 3 | FFS[2] (RS) | | (2) | 1.8061 | 40.9 |
| 4 | FFS[3] (RS) | | (3) | 1.8061 | 40.9 |
| 5 | FFS[2] | | (2) | | |
| 6 | ∞ | 0.30 | (4) | 1.5163 | 64.1 |
| 7 | ∞ | 0.03 | | | |
| Image plane | ∞ | | | | |

-continued

| FFS[1] | | | |
|---|---|---|---|
| $C_4$ | 2.6359e-002 | $C_6$ | -2.4546e-002 |

| FFS[2] | | | | | |
|---|---|---|---|---|---|
| $C_4$ | 1.7682e-002 | $C_6$ | -3.8128e-003 | $C_8$ | 4.7998e-004 |
| $C_{10}$ | -6.3670e-004 | $C_{11}$ | 3.1837e-006 | $C_{13}$ | -3.8462e-005 |
| $C_{15}$ | 1.3347e-004 | | | | |

| FFS[3] | | | | | |
|---|---|---|---|---|---|
| $C_4$ | 6.1786e-002 | $C_6$ | 4.4946e-002 | $C_8$ | 7.4963e-004 |
| $C_{10}$ | -1.6986e-003 | $C_{11}$ | 3.4179e-004 | $C_{13}$ | 3.0835e-004 |
| $C_{15}$ | 2.1444e-004 | | | | |

| Displacement and tilt(1) | | | | | |
|---|---|---|---|---|---|
| X | 0.00 | Y | 0.00 | Z | 0.31 |
| α | 8.10 | β | 0.00 | γ | 0.00 |

| Displacement and tilt(2) | | | | | |
|---|---|---|---|---|---|
| X | 0.00 | Y | 0.00 | Z | 1.79 |
| α | -44.87 | β | 0.00 | γ | 0.00 |

| Displacement and tilt(3) | | | | | |
|---|---|---|---|---|---|
| X | 0.00 | Y | 2.70 | Z | 2.04 |
| α | -72.98 | β | 0.00 | γ | 0.00 |

| Displacement and tilt(4) | | | | | |
|---|---|---|---|---|---|
| X | 0.00 | Y | 0.00 | Z | 3.85 |
| α | -12.00 | β | 0.00 | γ | 0.00 | fx = 2.3
fy = 2.1
fno(x) = 2.3
fno(y) = 2.2
2ω = 75°
DFS (H × V) = 1.659144 × 1.318075
ø = 1.0

Tabulated below are the parameters and found values of the respective conditions in Numerical Examples 1, 2, 3, 4 and 5.

| Parameter | Example 1 | Example 2 | Example 3 | Example 4 | Example 5 |
|---|---|---|---|---|---|
| fB | 1.516876 | 1.321894 | 1.378057 | 1.912788 | 1.754435 |
| fv | 2.044719 | 2.11203 | 1.790363 | 1.740984 | 2.162239 |
| hH | 1.715723 | 1.772204 | 1.790363 | 1.899951 | 1.659144 |
| ωH | 40° | 40° | 45° | 47.5° | 37.5° |
| t1 | 0.3 | 0.5 | 0.3 | 0.8 | 0.3 |
| Ncb | 1.5163 | 1.5163 | 1.5163 | 1.5163 | 1.5163 |
| SI | 0.3 | 0.2 | 0.21 | 0.1 | 0.31 |
| Iz | 3.075639 | 2.704887 | 2.878092 | 2.624281 | 4.018708 |
| BH | 1.315405 | 0.526372 | 0.518328 | 0.556938 | 1.146781 |
| ZH | 3.181039 | 2.820539 | 3.271479 | 2.646494 | 3.873145 |
| θs | — | — | — | — | — |

| Conditions | Example 1 | Example 2 | Example 3 | Example 4 | Example 5 |
|---|---|---|---|---|---|
| (1) fB/fv | 0.741851 | 0.625888 | 0.769708 | 1.098682 | 0.811398 |
| (2) t1/fB | 0.197775 | 0.378245 | 0.217698 | 0.418238 | 0.170995 |
| (3) Ncb | 1.5163 | 1.5163 | 1.5163 | 1.5163 | 1.5163 |
| (4) SI/Iz | 0.097541 | 0.07394 | 0.072965 | 0.038106 | 0.077139 |
| (5) BH/ZH | 0.413514 | 0.186621 | 0.158438 | 0.210444 | 0.296085 |
| (6) θs | — | — | — | — | — |
| (7) hH | 1.715723 | 1.772204 | 1.790363 | 1.899951 | 1.659144 |

While Examples 1, 2, 3, 4 and 5 have been described as applied to the projector apparatus, it is to be understood that if the image display plane of the display device is replaced by the imaging plane of an imaging device, it is then possible to provide a small-sized imaging apparatus. This makes it possible to eliminate or reduce inessential light and stray light caused by reflections at the imaging plane and optical members such as a cover glass, reflections at the combined optical surface, and internal reflections at the refracting surface in close proximity to the stop, working in favor of improvements in image-formation capability.

Some modifications to the aforesaid examples are now explained. Each of the following modifications may be applied to the optical system of any one of the aforesaid numerical examples, and to other forms of examples included in the invention as well.

When the image display plane 2 of a reflection type display device such as a DMD or a reflection type liquid crystal display device is projected, there is a space needed for receiving a lighting system between the image display plane and the prism optical system, because of the need of providing illuminating light from the front of the display device.

Figure 8:
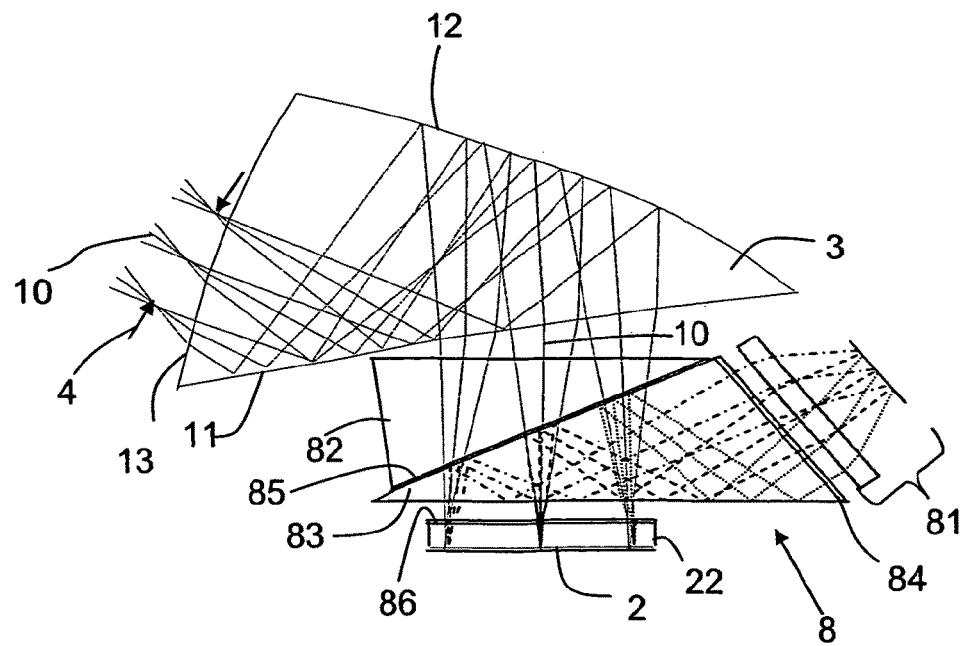
FIG. 8 is an optical path diagram for the projector apparatus, showing one modification to the invention in which a reflection type display device is incorporated.

FIG. 8 is an optical path diagram for the reflection type display device incorporated in place. There is a cover glass (optical member) 22 on the display side of the reflection type display device, and a lighting system 8 that gives out light from its front is located on the exit side thereof. That lighting system 8 comprises a lighting portion 81 and an optical member for illumination. The optical member takes on a cuboidal shape made up of two wedge prisms 82 and 83 cemented together, and light radiating out of a light box (lighting portion) 81 that is a light source located on the short side of the optical member for illumination enters the wedge prism 83 via a polarizing plate 84, is then reflected off at the bottom of that prism 83 and again at the slant, and then leaves that bottom, lighting the image display plane 2 of the display device.

Although the incident light is totally reflected nearly all over the bottom, it is to be noted that when there is a light component of not greater than the critical angle, it is partially provided with a reflective coating except an, area through which light leaves the prism 83.

At the slant that is the cementing surface of the two wedge prisms 82 and 83, a polarization beam splitter coating or film 85 is applied so that all light subjected to s-polarization through the polarizing plate 84 is reflected off at that slant. Thereafter, the light reflected off at the image display plane 2 of the reflection type display device passes twice through a quarter-wave plate 86 so that it turns into a p-polarized state, and light leaving the display device transmits through the slant of the wedge prisms 82 and 83 without being reflected at there, so that the light out of the display device can be guided to a prism optical system 3 with high efficiency.

Figure 9:
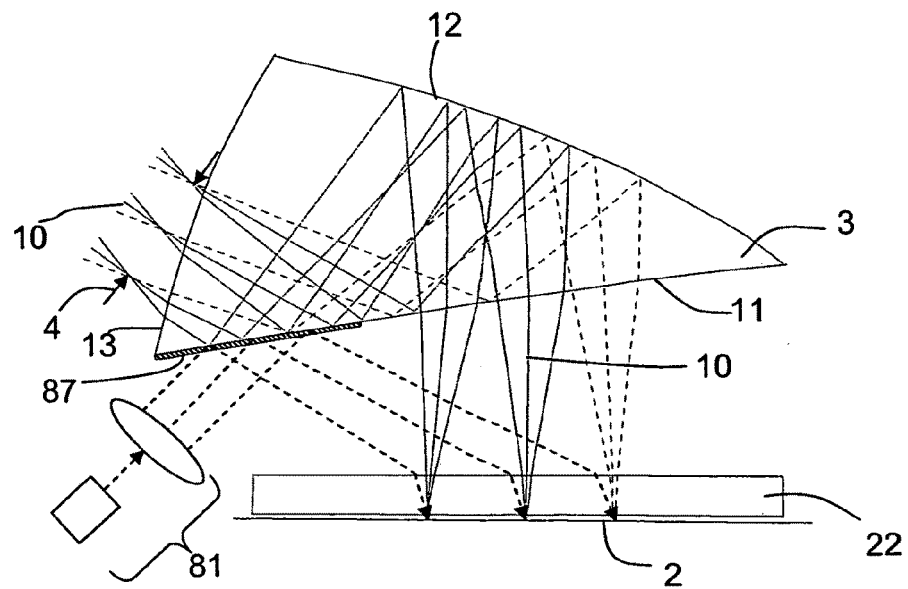
FIG. 9 is similar to FIG. 8, showing another modification.

Another modification to the arrangement wherein the image display plane 2 of the reflection type display device such as a DMD or a reflection type liquid crystal display device is projected is now explained with reference to the optical path diagram of FIG. 9. As shown in FIG. 9, a combined optical surface 11 of a prism optical system 3 is partially provided with a reflective coating 87, and illuminating light from a lighting portion 81 is entered into the reflective coating 87 through a space between the prism optical system 3 and an image display plane 2 to light the image display plane 2 of the display device with illuminating light reflected off at that reflective coating 87. This modified arrangement could curtail the number of optical parts for illumination, contributing more to weight reductions. Note here that the reflective coating 87 may be shared by a reflective coating 15 provided outside of the effective area of the combined optical surface 11, through which rays are to pass.

The same could also go true when the DMD is used as the display device; a lighting system similar to that shown in FIGS. 8 and 9 is provided between the prism optical system 3 and the DMD so that lighting can be implemented at the desired angle of incidence.

Figure 10:
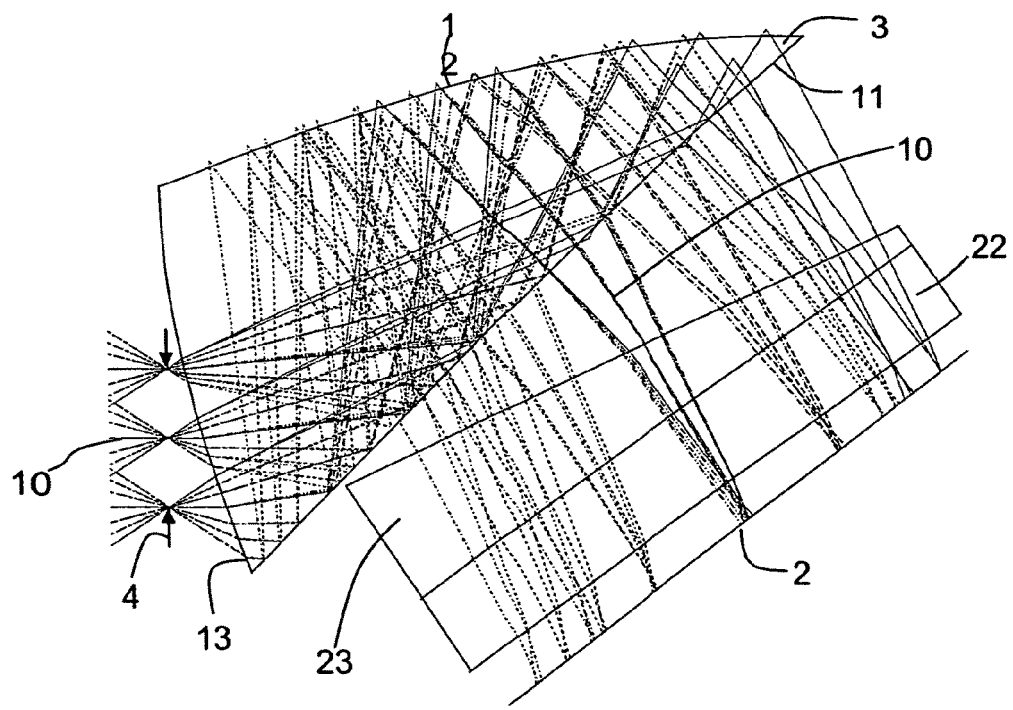
FIG. 10 is illustrative of one embodiment in which the projector apparatus of Example 1 is used, or it is used as an imaging apparatus, with the second optical member of wedge shape applied over a cover glass.

Means for removal of flares and ghosts is now explained. For removal of flares and ghosts, a refracting surface tilting with respect to the center ray 10 may be interposed between the prism optical system 3 and the image display plane 2. FIG. 10 is illustrative of one modification to the projector apparatus of Example 1 (FIG. 3), wherein the cover glass 22 (the first optical member) and the second optical member of wedge shape (wedge prism) 23 are cemented together. The angle of tilting of a refracting surface of the second optical member 23 that provides an air contact surface is set at 9° (θs=9°), and the d-line refractive index difference between the cover glass 22 and the second optical member 23 is set at 0. In other words, both members are made of the same optical material.

As the exit-side refracting surface of the second optical member 23 of wedge shape is tilted with respect to the center ray 10, it facilitates adjustment of an optical path taken by inessential light occurring from reflection at the combined optical surface 11 and reflected off at the surface of the second optical member 23. The cementing of this second optical member 23 of wedge shape to the cover glass (the first optical member) 22 enables reflections at the refracting surface of the cover glass to be eliminated or reduced, leading to elimination or reduction of ghosts and flares. Note here that the position and angle of the cover glass 22 or the image display plane 2 are adjusted in alignment with the insertion of the second optical member 23 of wedge shape.

Figure 11:
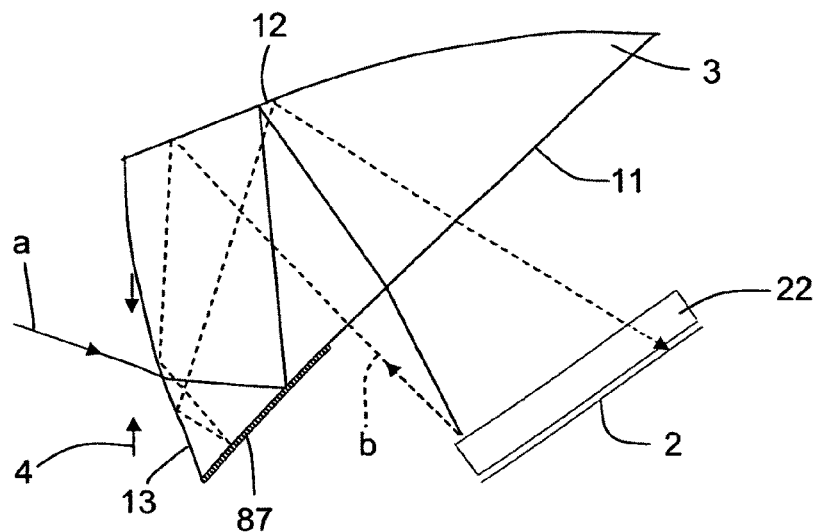
FIG. 11 is illustrative of why flares and ghosts occur.

Such an arrangement as in FIG. 10 is also facile in elimination and reduction of flares and ghosts in the case where the inventive prism optical system is used as an imaging apparatus. This is now explained with reference to FIG. 11. A light beam a entering a prism optical system 3 from an entrance surface 13 (exit surface 13 in the projection system) in proximate to a stop 4 is reflected off at a combined optical surface 11 and an internal reflecting surface 12, after which it leaves the combined optical surface 11. And a part of the light beam is reflected off at a cover glass 22 (the first optical member) 22 just before entering an imaging plane 2 (the image display plane 2 in the projection system), turning into inessential light b that goes back into the prism optical system 3 again through the combined optical system 11. The inessential light b is reflected off at the internal reflecting surface 12, then totally reflected at the entrance surface 13, then reflected at a reflective coating 87 of the combined optical surface 11, again totally reflected off at the entrance surface 13, then reflected off at the internal reflecting surface 12, and then arrives at the imaging plane 2 through the combined optical surface 11, ending up with ghosts and flares.

If a reflection-reducing coating is applied over the cover glass 22, ghost strength may then go down to some extents, but it cannot be eradicated off. Therefore, the second optical member having a tilting reflecting surface is interposed between the prism optical system 3 and the imaging plane 2 of the imaging device thereby holding back the occurrence of flares and ghosts. Although FIG. 10 has been explained as applied to the projector apparatus, it is to be noted that the same also holds true for the imaging apparatus. FIG. 10 shows that the second optical member (wedge prism) 23 is cemented onto the cover glass 22 of Example 1, and the angle of tilting of the refracting surface of the second optical member 23 that provides an air contact surface is set at 9° (θs=9°). The d-line refractive index difference between the cover glass 22 and the second optical member 23 is set at 0. In other words, both members are made of the same optical material.

In this case, the normal light displaces a bit from the original image position in the vertical direction of an image height in FIG. 10 (a direction within the drawing sheet); the positions and angles of the imaging plane 2 of the image device and cover glass 22 are adjusted by changing them as a one piece so that the normal light is restored back to the original position where clear images are obtainable.

If, in the design stage, the second optical member 23 of wedge shape has been provided and designed as an optical element, it is then possible to adjust an optical path length difference in the vertical direction of the wedge prism.

Figure 12:
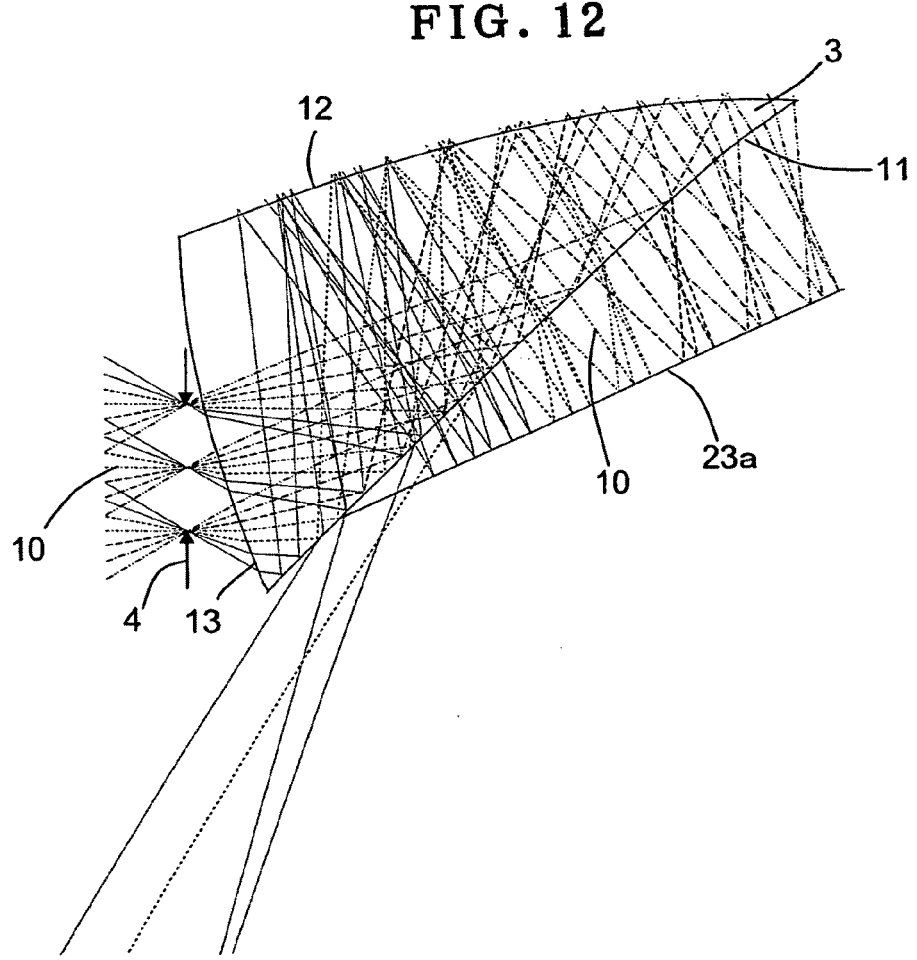
FIG. 12 is an optical path diagram for light reflected at an air contact surface of the second optical member of wedge shape in the case of FIG. 10.

FIG. 12 is an optical path diagram for a path taken by light reflected off at an air contact surface 23a of the second optical member 23 of wedge shape in FIG. 10, which has been determined by ray tracing in a range of ±20° with the angle of view as center within the drawing sheet. As can be seen from FIG. 12, light reflected off at the air contact surface 23a of the second optical member 23 goes back to the prism optical system 3, but there are a light beam totally reflected at the combined optical surface 11 toward the entrance surface 13 side and light leaving the prism optical system 3 after refraction and transmission through the combined optical surface 11. Nearly all of the former vanishes off if the portion of the entrance surface 13 except the entrance area is formed into a roughened or absorptive surface. Nearly all of light incident on the effective surface leaves intact, offering no problem with the imaging apparatus. The latter is light incident on the stop 4 side of the combined optical surface 11, so it does not enter the imaging plane 2 of the imaging device because it leaves after refraction through the combined optical surface 11.

If the optical path involved is reversed back, the inventive projector apparatus may be applied to an imaging apparatus as embodied below.

Embodiment A

An imaging apparatus comprising:

an imaging device having an imaging plane for taking an image, a prism optical system of positive refracting power adapted to form said image on said imaging plane, and a stop located on an object side with respect to said prism optical system and adapted to restrict the thickness of a light beam entering said prism optical system, characterized in that:

said prism optical system comprises an internal reflecting surface concave on said imaging plane side, an entrance surface through which a normal light beam is incident on said prism optical system, and a combined optical surface adapted to reflect a normal light beam out of said entrance surface and transmit a normal reflected light beam out of said internal reflecting surface, wherein:

a normal light beam incident from said stop takes such a path that it enters said prism optical system through said entrance surface, is then reflected off at said combined optical surface and then at said internal reflecting surface, and then leaves said combined optical surface, arriving at the imaging plane, with satisfaction of the following condition (A):

$$0.3 < fB/fv < 1.5 \quad (A)$$

where fB is a length, as calculated on an air basis, from said combined optical system of said prism optical system to said imaging plane along a center ray where said center ray is defined as a normal ray that passes through a center of said stop, arriving at a center of said imaging plane, and fv is a value represented by $$fv = hH/(\tan \omega H)$$

where, given a horizontal direction is a direction vertical to a plane including the center ray before and after reflection at said internal reflecting surface, ωH is a maximum taking angle of view with respect to the center ray on an object side in said horizontal direction, and hH is a distance from a center of said imaging plane to the farthest imaging position in said horizontal direction.

Embodiment B

The imaging apparatus according to Embodiment A, characterized in that in order to protect said imaging plane, there is a transparent optical member interposed between said imaging plane and said prism optical system, wherein the thickness of said optical member along said center ray satisfies the following condition (B):

$$0.17 \leq t1/fB \leq 0.7 \tag{B}$$

where t1 is the thickness of said optical member in a direction along said center ray.

Embodiment C

The imaging apparatus according to Embodiment B, characterized in that said optical member is made of a material that satisfies the following condition (C):

$$1.4 \leq Ncb \leq 2.1 \tag{C}$$

where Ncb is the d-line refractive index of said optical member.

Embodiment D

The imaging apparatus according to any one of Embodiments A, B and C, characterized by satisfying the following condition (D) in terms of position relationships between said stop, said entrance surface of said prism optical system and said imaging plane.

$$SI/Iz < 0.6 \tag{D}$$

where SI is the distance between said stop and said entrance surface along said center ray, and Iz is the distance from the center of said stop to a plane including said imaging plane.

Embodiment E

The imaging apparatus according to any one of Embodiments A, B, C and D, characterized in that outside of an effective area of said combined optical surface through which rays transmit, and on at least a portion of an effective area of said combined optical surface where rays are reflected off, there is a reflective coating provided.

Embodiment F

The imaging apparatus according to Embodiment E, characterized in that the range of said reflective coating applied satisfies the following condition (E):

$$0.05 < BH/ZH < 0.5 \tag{E}$$

where ZH is the length of a line segment that connects both ends of the effective reflecting area of said combined optical surface in a plane including the center ray before and after reflection at said internal reflecting surface, and BH is the length of a line segment that connects both ends of the reflective coating portion in the effective reflecting area of the said combined optical surface in a plane including the center ray before and after reflection at said internal reflecting surface.

Embodiment G

The imaging apparatus according to any one of Embodiments A to F, characterized in that in order to provide a protection of said imaging plane, there is a transparent optical member interposed between said imaging plane and said prism optical system, and a second optical member cemented to the prism optical system side of said optical member and having a refracting surface tilting with respect to said center ray.

Embodiment H

The imaging apparatus according to Embodiment G, characterized in that said tilting refracting surface satisfies the following condition (F):

$$5° < \theta s < 15° \tag{6}$$

where θs is the angle made, in a planar section including the center ray just after leaving said tilting refracting surface and the center of said stop, between the center ray just after leaving the refracting surface and a perpendicular toward said prism optical system side at a position of said refracting surface through which said center ray passes, provided that a perpendicular tilting in a direction away from the stop is assumed to have plus sign.

Embodiment I

The imaging apparatus according to Embodiment G or H, characterized in that the absolute value of a d-line refractive index difference between said optical member and said second optical member is set at 0.5 or less.

Embodiment J

The imaging apparatus according to any one of Embodiment A to I, characterized by satisfying the following condition (G):

$$1.0 \text{ mm} < hH < 2.5 \text{ mm} \tag{G}$$

More preferably, two or more of Embodiments A to I should be combined in use, and the respective conditions should be changed as follows, because the aforesaid advantages are achievable in a more reliable manner.

More preferably, the lower and upper limits to condition (A) should be set at 0.45, specifically 0.6, and 1.3, specifically 1.15, respectively.

More preferably, the lower and upper limits to condition (B) should be set at 0.2, specifically 0.3, more specifically 0.4, and 0.6, specifically 0.5, respectively.

More preferably, the lower limit to condition (C) should be set at 1.5.

More preferably, the upper limit to condition (D) should be set at 0.2, specifically 0.1.

More preferably, the lower and upper limits to condition (E) should be set at 0.1, specifically 0.15, and 0.46, specifically 0.43, respectively.

More preferably, the upper and lower limits to condition (F) should be set at 8° and 12°, respectively.

More preferably, the lower and upper limits to condition (G) should be set at 1.5 mm, specifically 1.7 mm, and 2.2 mm, specifically 2.0 mm, respectively.

According to the present invention, there can be a projector apparatus provided which incorporates a prism optical system having positive refracting power in favor of size reductions, and in which the influences of inessential light occurring at the prism optical system can easily be eliminated or reduced.

I claim:

1. A projector apparatus, comprising:
a display device having an image display plane for displaying an image,
a prism optical system of positive refracting power adapted to enlarge and project said image displayed on said image display plane, and
a stop located on a projection side with respect to said prism optical system and adapted to restrict a thickness of a light beam to be projected, wherein:
said prism optical system comprises an internal reflecting surface concave on said image display plane side, a combined optical surface adapted to transmit a normal light beam out of said image display plane and reflect a normal light beam reflected off at said internal reflecting surface, and an exit surface through which a normal light beam entering said prism optical system leaves, wherein:

the normal light leaving said image display plane takes such a path that it enters said prism optical system through said combined optical surface, is then reflected off at said internal reflecting surface and then at said combined optical system, and then leaves said exit surface, arriving at a projection image through said stop, with satisfaction of the following condition (1):

$$0.3 < fB/fv < 1.5$$

where fB is a length, as calculated on an air basis, from said combined optical surface of said prism optical system to said image display plane along a center ray where said center ray is defined as a normal ray that leaves a center of said image display plane and passes through a center of said stop, and fv is a value represented by $$fv = hH/(\tan \omega H)$$

where, given a horizontal direction is a direction vertical to a plane including a center ray before and after reflection at said internal reflecting surface, $\omega H$ is a maximum angle of projection with respect to a center ray on a projection side in said horizontal direction, and hH is a distance from the center of said image display plane to the farthest display position in said horizontal direction.

2. The projector apparatus according to claim 1, which further comprises an optical member adapted to protect said image display plane and interposed between said image display plane and said prism optical system, wherein a thickness of said optical member along said center ray satisfies the following condition (2):

$$0.17 \leq t1/fB \leq 0.7$$

where t1 is the thickness of said optical member in a direction along the aforesaid center ray.

3. The projector apparatus according to claim 2, wherein said optical member satisfies the following condition (3):

$$1.4 \leq Ncb \leq 2.1$$

where Ncb is a d-line refractive index of said optical member.

4. The projector apparatus according to claim 1, which satisfies the following condition (4) in terms of position relationships between said stop, said exit surface of said prism optical system and said image display plane:

$$SI/Iz < 0.6$$

where SI is a distance between said stop and said exit surface along said center ray, and Iz is a distance from a center of said stop to a plane including said image display plane.

5. The projector apparatus according to claim 1, which further comprises a reflective coating provided outside of an effective area of said combined optical surface through which rays transmit and on at least a portion of an effective area of said combined optical surface where light rays are reflected off.

6. The projector apparatus according to claim 5, wherein a range over which said reflective coating is applied satisfies the following condition (5):

$$0.05 < BH/ZH < 0.5$$

where ZH is a length of a line segment that connects both ends of the effective reflecting area of said combined optical surface in a plane including the center ray before and after reflection at said internal reflecting surface, and BH is a length of a line segment that connects both ends of the reflective coating in the effective reflecting area of said combined optical surface in a plane including the center ray before and after reflection at said internal reflecting surface.

7. The projector apparatus according to claim 1, wherein: said display device is a reflection type display device, and said imaging apparatus comprises a lighting system for lighting the image display plane of said display device, wherein said lighting system comprises a lighting portion and a reflecting surface adapted to reflect a light beam emitted out of said lighting portion for illumination of said image display plane.

8. The projector apparatus according to claim 7, wherein: said lighting system further comprises two wedge prisms interposed between said display device and said prism optical system, and a light beam emitted out of said lighting portion is reflected multiple times at an inside of at least one of said two wedge prisms, arriving at said image display plane, and a normal light beam leaving said image display plane is guided into said prism optical system through said two wedge prisms.

9. The projector apparatus according to claim 5, wherein: said display device is a reflection type display device, and said imaging apparatus comprises a lighting system for lighting the image display plane of said display device, wherein:

said lighting system comprising a lighting portion and a reflecting surface adapted to reflect a light beam emitted out of said lighting portion for illumination of said image display plane, wherein said reflecting surface in said lighting system is defined by a reflecting surface of said reflective coating applied onto said combined optical surface.

10. The projector apparatus according to claim 1, which further comprises a transparent optical member adapted to provide a protection of said image display plane and interposed between said image display plane and said prism optical system, and a second optical member cemented to said prism optical system side of said optical member and having a refracting surface tilting with respect to said center ray.

11. The projector apparatus according to claim 10, wherein said tilting refracting surface satisfies the following condition (6):

$$5° < \theta s < 15°$$

where $\theta s$ is an angle made, in a planar section including the center ray just after leaving said tilting refracting surface and a center of said stop, between the center ray just after leaving the refracting surface and a perpendicular toward said prism optical system side at a position of said refracting surface through which said center ray passes, provided that a perpendicular tilting in a direction away from the stop is assumed to have a plus sign.

12. The projector apparatus according to claim 10, wherein an absolute value of a d-line refractive index difference between said transparent optical member and said second optical member is set at 0.5 or less.

13. The projector apparatus according to claim 1, which satisfies the following condition (7):

$$1.0 \text{ mm} < hH < 2.5 \text{ mm}.$$

* * * * *